2,997,395
PROCESS FOR THE MANUFACTURE OF CHEESE CURD

Norman James Berridge, Shinfield, near Reading, England, assignor to National Research Development Corporation, London, England, a British corporation
No Drawing. Filed July 2, 1959, Ser. No. 824,485
Claims priority, application Great Britain July 11, 1958
15 Claims. (Cl. 99—116)

This invention relates to processes for the manufacture of cheese curd and of casein.

In the most commonly practised process for manufacturing cheese, the raw milk is heat treated and if necessary cooled and stored. When required it is warmed slightly, e.g. to 30° C., and run into a vessel in which a starter and rennet are added. The curd so produced contains too much moisture and is therefore cut into small pieces by hand or with suitable mechanical assistance, and further treated by raising the temperature gradually to about 35–40° C., holding it at this temperature for a controlled period and allowing it to settle so that the whey may be removed. This process requires great care and skill to avoid losing too much fat from the delicate curd. Further processes of piling and draining must be carried out before the curd is in the final form, i.e. sufficiently firm and containing up to 50% moisture (e.g. 44%). It will be understood, of course, that the fermentation properties of both milk and starter are variable quantities, and that it is in the careful control of the above conditions within the various limits imposed by different cheeses and different qualities of milk and starter that the art of the cheese-maker is exercised.

Care must be taken that the acid formation by the starter proceeds at a suitable rate in relation to the coagulation of the curd and separation of the whey. The process, after adding rennet, usually takes four to six hours.

For certain types of cheese, e.g. coulommier, and for the manufacture of rennet casein, the acidifying substance is omitted. In these types of cheeses, some degree of acidification occurs after curd is made. The acid is produced by the activity of bacteria derived from the milk. In rennet casein manufacture the process is similar to that of cheese making except that no acidity is allowed to develop and separated milk is used.

The object of the present invention is to enable curd to be produced in its final form without cutting and subsequent process stages in such a way that laborious techniques are avoided and maximum opportunity is provided for automatic operation.

According to the invention there is provided a process for the manufacture of cheese curd or casein which comprises holding the curd-forming mixture, consisting of milk, rennet and if required acidifying substances, at a temperature of not more than 15° C. for at least a period of time such that the enzymic action of the rennet is nearing completion or is complete, subsequently quickly heating the mixture to a temperature of not less than 30° C., and holding the mixture at that temperature so that rapid coagulation of curd and rapid exudation of whey can occur. Where acidifying substances are added, they may be the usual starter or other micro-organisms or an acid e.g. hydrochloric acid, or a combination of both starter and acid. A particularly suitable starter has been found to be *Streptococcus thermophilus*. Other acidifying substances may be used if required, for example lactone or an ester and esterase. The acidifying substances are added in sufficient quantities to give the milk a pH of 5.6 to 6.0. In a preferred process, a small quantity of starter (2%) is used in combination with hydrochloric acid. This small amount of starter produces acid after the curd has been formed and assists in the ripening of the curd.

The first stage of the process consists of holding the curd-forming mixture at below 15° C., at which temperature coagulation does not occur. For most milks, lower temperatures still will be necessary, for example below 10° C. and preferably below 5° C. The milk may conveniently be acidified, cooled and the rennet then added.

The holding of the milk in non-coagulating condition enables the rennet to commence its normal action of breaking down the casein molecules but without forming curd. The time taken for the enzymic action to near completion, and thus the minimum length of time of the holding stage, depends upon the quantity of rennet added to the milk, and also whether or not acidifying substances are required. The minimum acceptable holding period may be calculated by doubling the time required for the curd-forming mixture to clot at 30° C. for every ten centigrade degrees below 30° C. at which the mixture is held. Thus in the presence of acidifying substances and with double the usual quantity of rennet the holding stage may be as short as ten minutes, and it is possible that by the addition of even larger quantities of rennet an even shorter holding time may be acceptable. Generally, however, it is preferably about 1 to 2 hours. Longer periods of time are permissible if the greater proportion of the acidifying substance used is hydrochloric acid, but not if a starter only is used. If no acidifying substances are present, then it is preferable to use a holding time of at least 3 hours, and times of up to 2 days may be employed without adverse effect.

It will thus be appreciated that the length of time for which the curd-forming mixture is held under non-coaglating conditions will vary according to the quantity of rennet and acidifying substances present, and also the quality of milk and starter used. Thus, if non-acidified milk is used, larger quantities of rennet (e.g. 20 to 30 times) or longer holding periods at low temperatures (e.g. 5 hours) or a combination of the two (e.g. 5 times the rennet and one hour holding period) are desirable. If too short a holding period is used, the milk will subsequently take too long to coagulate on being quickly heated, and the curd formed will be too soft with a result that the exuding whey will contain a surplus of fat. If too long a holding period is used, the curd-forming mixture will thicken in the cold, with the result that once again large losses of fat in the whey will occur.

In the second stage of the process the curd-forming mixture is quickly heated to a temperature above 30° C. In a preferred method for the manufacture of cheese curd, the mixture is quickly heated to between 50–70° C. One method for conveniently carrying out this heating consists of allowing the curd-forming mixture to flow as a thin layer over a surface e.g. the surface of a plate or trough, heated to the temperature of 50–100° C., or by depositing it on a heated surface from which it is subsequently removed after a suitable period of time (e.g. 20 to 100 secs.). Alternatively the milk may be heated by direct contact with hot liquid e.g. water or whey, or a hot gas e.g. steam or possibly by infra red rays or electrical energy. The cud is formed in 5–20 secs. and reaches a satisfactory form in 20 to 100 seconds.

It will be understood that the reduction in processing time allows of the process being carried out continuously. Thus, in a preferred method for carrying out the invention, milk is first treated with acidifying substance, if required, and is then passed through a cooler into a vessel or pipe where rennet is added in suitable proportions. The curd-forming mixture is then held in this cooled vessel or pipe for a period of time not less than a short period of the order of ten minutes and not greater than 2 days, and is subsequently caused to flow through a rapid heat device where it is heated to a temperature of not less than 30° C. and held at that temperature so that rapid coagulation of curd and rapid exudation of whey can occur. If acidifying substance is needed, the milk is first fed continuously into starter culture or mineral acid or a mixture of the two in a fermentation vessel at a rate such that the pH of the milk flowing out of the vessel is within the limits 5.6 to 6.0. Alternatively starter or acid or both may be added in measured quantities batch-wise, or fed continuously to the flowing milk. The method also clearly lends itself to the use of automatic method of pH control, addition of rennet etc.

The invention thus provides a continuous process in which the enzymes or rennet action is separated from the curd coagulation action and in which the curd goes through the soft and delicate stage almost instantaneously whereby it is possible to avoid disrupting the curd into a too finely divided state which would result in undue losses of fat and protein in the whey.

The process also abolishes the most difficult and uncertain part of cheese making, namely the simultaneous control of acidity and syneresis. In this invention, the acidity is adjusted at the beginning of the process which is so rapid that the microorganisms cannot cause any significant change. The entire operation can be carried out mechanically. The use of a closed fermentation vessel for the acidification permits greater precautions to be taken against the common and sometimes disastrous infection of the starter with bacteriophage.

The following examples further illustrate the invention:

In these examples the mixture of milk, rennet and acidifying substance was kept for approximately one hour in a domestic type refrigerator and then heated in a thin layer on a stainless steel plate 110 sq. in. in area (690 sq. in.), the other side of the plate being heated by circulating hot water. An apparatus was arranged to deliver a film of the prepared milk to the plate and then to scrape off the resulting mixture of curds and whey after a definite time interval in the range of 25–100 sec. by means of a scraper behind which was the delivery tube for renewing the film of milk. Thus fresh milk mixture was added each time the curds and whey were scraped off the plate thereby achieving a cyclic or practically continuous process. The curd was received on a moving belt which permitted further drainage during a period which could be varied between 7 and 20 min. before the curd was delivered into a perforated container.

*Example 1.*—Forty-five litres of raw milk were inoculated with 0.5 litre of clotted starter (No. 509) and enough hydrochloric acid was added to bring the pH of the milk to 5.8. It was then cooled to 5° and eight portions of 4.5 litres each were bottled and stored in the refrigerator. To the first portion was added 2 ml. of standard cheese-making rennet and 1½ hrs. later the mixture was put through the apparatus described above. The same procedure was followed for each of the other samples except that some were kept for up to 2½ hrs. after rennet had been added, although it is to be expected that the action of the rennet would be complete in 30–40 min. The apparatus was adjusted to give different conditions of time and temperature for the formation of curd. The yields of curd, losses of fat, and pH values of the curd at different intervals of time are shown in Table I.

*Example 2.*—Twenty-two litres of pasteurised milk were inoculated with 2% of starter (No. 1007), adjusted to pH 5.78 with hydrochloric acid, cooled and treated with rennet as in Example 1. The temperature of the heating water was 90° C. the cycle time of the apparatus was 25 seconds, and the whole of the milk (approximately 5 gallons) was allowed to pass through the apparatus without further attention, the time required being approximately 2½ hours. The curd was collected and allowed to drain for several days at room temperature in a centrally heated building (70–75° F.). During this time 700 ml. of whey drained from the curd. The pH of the curd after 3 days was 5.71 and the moisture at the end of the drainage period was 47%. The curd was broken by hand, salted at the rate of 2% and pressed by hand into a glass jar. The surface of the curd was protected with a disc of greaseproof paper and ripening was allowed to take place at room temperature. After two months the flavour of the resulting curd was rather acid but definitely cheesy. Mould was then allowed to grow so that after four months the cheese had become blue and had a flavour characteristic of blue-veined cheese.

*Example 3.*—4.5 litres of raw milk were inoculated with 1% of a clotted starter consisting of *Streptococcus thermophilus*, acidified cooled and treated with rennet as in the former examples. The water supplying heat to the steel plate was maintained at 95° C. and the cycle time reduced to 15 sec. The curd was kept overnight at 39° without drainage. Its pH was then 5.5 and its moisture content 45%. After two days at room temperature with drainage the curd had a pH of 5.2 and a moisture content of 42%.

*Example 4.*—4.5 litres of raw milk were inoculated with a starter consisting of *S. thermophilus* and maintained at 40–45° until the pH had fallen to 5.7. The milk was then cooled and stored overnight. Its pH was then found to be 5.6. Fresh milk was added until a pH reading of 5.8 was obtained. The mixture was renneted as above and put through the apparatus using a water temperature of 95° and a cycle time of 24 sec. After keeping the curd for two days at room temperature with drainage its pH was 5.4 and its moisture content 46%.

*Example 5.*—4.5 litres of raw milk were inoculated with 0.5 litre of starter (No. 509), and adjusted to pH 5.7 with HCl. Rennet was allowed to act in the cold as usual at a concentration of 4 ml. per 9 l. for half to 1½ hours. The mixture was put through the apparatus with the heating water at 70° C. and a cycle time of 60 sec. The total time required was 5½ hours. The pH of the curd next day was 5.5. It was stored at room temperature in an atmosphere of carbon dioxide to prevent mould growth. After 2 days 300 ml. of whey had drained out of the curd which was now consolidated into one mass. Its pH at this time was 4.9. The next day an average reading of 4.96 was obtained and a day later the value had fallen to 4.88.

*Table I*

| | | | | | | | | |
|---|---|---|---|---|---|---|---|---|
| Temperature of circulating water (° C.) | 60 | 60 | 70 | 70 | 70 | 80 | 80 | 80 |
| Cycle time including 6 sec. wipe-off time (sec.) [1] | 55 | 99 | 28 | 55 | 99 | 28 | 46 | 99 |
| Vol. of milk mixture per cycle (ml.) | 116 | | 82 | 105 | 167 | 92 | 116 | 196 |
| Volume of milk mixture ÷ cycle time (ml./sec.) | 2.1 | | 2.9 | 1.9 | 1.7 | 3.3 | 2.5 | 1.9 |
| Temperature of curd leaving plate (° C.) | 50 | 51 | 51 | 56 | 59 | 57 | 62 | 68 |
| Temperature of curd leaving belt (° C.) | 36 | 24 | 41 | 31 | 28 | 42 | 33 | 27 |
| Volume of whey separated during drainage of curd overnight (ml.) | 570 | 400 | 560 | 300 | 130 | 450 | 130 | 180 |
| Moisture content of curd after drainage overnight (percent) | 55 | 48 | 49 | 44 | 43 | 48 | 44 | 44 |
| Yield of dry weight in curd (g) [2] | 305 | 295 | | 313 | 288 | 277 | 282 | 258 |
| Total loss of fat in whey (a) separating during process (g) [3] | 0.6 | 1.3 | 1.2 | 3.3 | 4.8 | 2.8 | 6.9 | 14.2 |
| Total loss of fat in whey (b) separating during drainage (g) | 3.2 | 1.2 | 2.4 | 2.4 | 1.5 | 3.1 | 1.5 | 1.7 |
| pH of curd after one day | 5.4 | 5.2 | 5.0 | 5.5 | 5.8 | 5.5 | 5.8 | 5.8 |
| pH of curd after 2 days | 4.9 | 5.0 | 5.0 | 5.1 | 5.8 | 5.4 | 5.7 | 5.8 |
| pH of curd after 4 days | 4.8 | 4.9 | 4.8 | 5.0 | 5.2 | 4.9 | 5.0 | 5.1 |

[1] I.e., approximate time during which the milk rests on the hot plate.
[2] A reasonable yield for this milk supply on the basis of previous and subsequent analyses, would be 278 g. dry weight from 4.5 l. which is equivalent to 1 lb. of curd of 38% moisture per gallon.
[3] Total fat content of the 4.5 l. of milk—162 g.

I claim:

1. A process for the manufacture of curd which comprises holding a curd-forming mixture comprising milk and rennet at a temperature not higher than 15° C. under non-coagulating conditions for at least a period of time that the enzymatic action of the rennet is at least nearing completion, subsequently heating the mixture rapidly to a temperature of at least 30° C. and holding the mixture at such higher temperature so that rapid coagulation of curd and rapid exudation of whey can occur.

2. A process according to claim 1 in which the curd-forming mixture comprises milk and rennet to which sufficient acidifying substance has been added to give the milk a pH of 5.6 to 6.0.

3. A process according to claim 2 in which at least a part of the acidifying substance added is a starter.

4. A process according to claim 2 in which the acidifying substance is a combination of starter and an acid.

5. A process according to claim 3 in which the starter added is *Streptococcus thermophilus*.

6. A process according to claim 4 in which the acid used is hydrochloric acid.

7. A process according to claim 1 in which the curd-forming mixture is held at a temperature of not more than 15° C. for at least a period of time equal to that calculated by doubling the time required for the curd-forming mixture to clot at 30° C. for every ten centigrade degrees below 30° C. at which the mixture is held.

8. A process according to claim 1 in which the curd-forming mixture consists of milk, rennet and acidifying material and the curd-forming mixture is held at a temperature below 15° C. for a short period of time not less than of the order of ten minutes and not more than four hours.

9. A process according to claim 1 in which the curd-forming mixture consists of milk and rennet without acidifying substance and the curd-forming mixture is held at a temperature below 15° C. for a period of time not less than three hours and not more than two days.

10. A process according to claim 7 in which the holding temperature is below 10° C.

11. A process according to claim 7 in which the holding temperature is below 5° C.

12. A process according to claim 1 in which the curd-forming mixture after being held at the lower temperature under non-coagulating conditions is quickly heated to a temperature between 50° C. and 70° C. and held at that temperature for a period of time not less than twenty seconds and not more than one hundred seconds.

13. A continuous process for the manufacture of curd which comprises continuously introducing cooled milk into a cooled space, adding rennet to the milk in such cooled space to produce a curd-forming mixture, holding the curd-forming mixture thus formed in such cooled space at a temperature not higher than 15° C. under non-coagulating conditions for at least a period of time that the enzymatic action of the rennet is at least nearing completion, subsequently causing the mixture to flow through a heated space while it is rapidly heated to a temperature of at least 30° C. and held at such temperature to effect rapid coagulation of curd and rapid exudation of whey.

14. A continuous process for the manufacture of cheese curd according to claim 13 in which an acidifying substance in measured quantities is added to the milk before it is introduced into the cooled space.

15. A continuous process for the manufacture of cheese curd according to claim 13 in which the milk before being introduced into the cooled space is continuously fed into a space containing acidifying substance so that the milk flowing out of such space and being introduced into the cooled space has a pH between 5.6 and 6.0.

References Cited in the file of this patent

UNITED STATES PATENTS

| | | |
|---|---|---|
| 1,953,734 | Plawenn et al. | Apr. 3, 1934 |
| 2,387,276 | Link | Oct. 23, 1945 |
| 2,712,999 | Strezynski | July 12, 1955 |

OTHER REFERENCES

"The Manufacture of Cheese of the Cheddar Type from Pasteurized Milk," by Sammis and Bruhn, Dept. of Agriculture, Bureau of Animal Industry—Bulletin 165, issued June 30, 1913, Government Printing Office, Washington, D.C., pages 15–17.